Patented Dec. 1, 1942

2,303,550

UNITED STATES PATENT OFFICE 2,303,550

DEHYDROGENATION OF CYCLOHEXANOLS

Augustus S. Houghton, Rivervale, N. J., and Homer E. McNutt, Philadelphia, Pa., assignors, by mesne assignments, to Allied Chemical & Dye Corporation, a corporation of New York No Drawing. Application August 2, 1940, Serial No. 350,106

11 Claims. (Cl. 260—586)

This invention relates to the dehydrogenation of cyclohexanols to produce cyclohexanones, i. e. the cycloketones. By the expressions "cyclohexanols" and "cyclohexanones" as used in the specification and claims it is intended to include the homologs of cyclohexanol and cyclohexanone respectively, such, for example, as methyl cyclohexanols and methyl cyclohexanones respectively.

Much research work has been done on the vapor phase dehydrogenation of cyclohexanols. Investigators in this art have generally considered copper as the preferred catalyst for this reaction because it does not intend to promote the complete dehydrogenation of the cyclohexanols to phenols and other secondary reactions, as is the case with nickel catalyst. For example, Sabatier and Senderens (Sabatier-Reid "Catalysis in Organic Chemistry," paragraph 664) point out that copper is superior to nickel as catalyst in dehydrogenation of alcohols to aldehydes or ketones, because the use of nickel results in more violent reaction and causes splitting up of the aldehyde or ketone with formation of carbon monoxide. The use of copper catalyst, it has been recognized in the art (United States Patent 1,895,516 of January 31, 1933) presents certain difficulties; for example, it quickly deteriorates as the result of sintering and has strong dehydrating tendencies, causing more cyclohexene formation from cyclohexanol than takes place when using nickel catalysts.

It is an object of this invention to provide a process for dehydrogenating cyclohexanols to produce cyclohexanones which permits higher production rates of cyclohexanones than prior known methods.

We have made the surprising discovery that nickel catalysts can be effectively used in the dehydrogenation of cyclohexanols to cyclohexanones with undesirable side reactions minimized, and satisfactory yield of cyclohexanones obtained with relatively high throughput of the reactants, by carrying out the reaction under the following conditions: (1) utilizing at least 2 mols, and preferably from 2 to 4 mols of hydrogen per mol cyclohexanols; (2) controlling the temperature in the catalyst zone, as measured by a thermocouple placed in the center of the catalyst mass, so that it is within the range of 200° to 350° C., preferably 250° to 280° C.; (3) maintaining the pressure within the catalyst zone in the neighborhood of 0.3 to 5 atmospheres, preferably about 1 atmosphere; and (4) correlating the linear velocity of the reactants to the size or extent of the catalyst zone so that the apparent time of contact between the reactants and the catalyst is less than 30 seconds, and preferably less than 10 seconds.

As the reaction is endothermic, the temperature in the catalyst is controlled by heating the catalyst. This may be accomplished by placing the catalyst in converters equipped to heat the contents thereof; electrically heated converters, or converters provided with jackets for circulation of a heating medium therethrough, may be used.

For optimum results all of the above conditions should be observed; by so doing, we have obtained reaction products containing from 40% to 70% of cyclohexanones. Generally, however, when carrying out the reaction so as to obtain maximum conversion of cyclohexanols to cyclohexanones, say, products containing of the order of 70% or higher cyclohexanones, undesirable side reactions take place; e. g. cyclohexanones produced are converted to phenols. To minimize such side reactions we have found it advantageous to carry out the reaction under conditions hereinabove specified so as to yield products containing about 50% cyclohexanones.

Of the conditions above specified the most important, from the standpoint of maintenance of catalyst activity and high ketone production rates, is the use of hydrogen in the amount of at least 2 mols per mol of cyclohexanol, and preferably of from 2 to 4 mols per mol of cyclohexanol. Smaller proportions of hydrogen, we have found, will cause rapid fouling and loss of activity of the catalyst with consequent reduction in production rates. Larger proportions of hydrogen than 4 mols per mol of cyclohexanol will reduce the percentage conversion to some extent. Next in importance are temperature and pressure.

The maintenance of the temperature specified in combination with the use of hydrogen in the amount specified permits high rates of throughput of reactants with satisfactory conversions. For optimum results it is preferred to maintain the temperatures at the inlet end of the system, i. e. where the cyclohexanols first contact the catalyst at a temperature near the lower limit of the range specified, e. g. at a temperature from about 200° to 260° C. and to maintain the temperature at the exit end of the system, i. e. where the products of reaction are withdrawn from the catalyst zone at a point near the upper limits of the range specified, e. g. 260° to 280° C. The preferred pressure of 1 atmosphere is selected for practical reasons, i. e. it is simple and economical to operate at this pressure. If the process were carried out at subatmospheric pressures there would be the hazard of air leaking into the system. Pressures higher than 1 atmosphere have the disadvantage that they result in lower conversions of the cyclohexanols but this is counterbalanced in part by the factor that operating at high pressures facilitates temperature control. Conversely, lower pressures give better conversions, but present greater difficulties of controlling the temperature in the catalyst zone.

The linear velocity of reactants passing through the converter will vary depending upon the size of the catalyst particles, their spacing in the converter, the diameter of the converter, and other factors. A velocity of at least 1 foot per second should be used to insure good turbulent flow which aids the contact of reactants with the catalyst and facilitates temperature control. For example, for a 4 inch interior diameter converter containing the usual nickel catalyst, such as nickel turnings having an active nickel surface, or pea-size "Alundum" base catalyst having a nickel surface layer, a linear velocity of about 4 feet per second has been found satisfactory.

Preferably, the reaction is carried out by passing the cyclohexanol in vapor phase and hydrogen over a stationary catalyst, i. e. masses of nickel catalyst arranged in two or more converters, each provided with electrical or other heating elements to maintain the catalyst therein at the desired temperature. We have found it is advantageous to carry out the reaction so as to maintain fresh catalyst in the front end of the system, i. e. at the point where the entering cyclohexanol-hydrogen stream initially contacts the catalyst, and partially spent catalyst at the back or finishing end of the system. By so doing, we have found there is less likelihood of promoting undesirable side reactions and decomposition of the cyclohexanone reaction product. In carrying out the process continuously, two or more reaction tubes or converters, one containing fresh catalyst and the others, in case more than two converters are used, catalyst of different degrees of activity, may be employed, and the vapor phase reactants caused to flow first through the tube containing the fresh catalyst and then through the tube or tubes containing the partially spent catalyst, the reaction products being withdrawn from the tube or converter in which the least active catalyst is disposed. When the catalyst in the last-mentioned tube has become spent or substantially inactive, this tube or converter is replaced by a tube or converter containing fresh catalyst and the flow of reactants caused to pass first through the tube or converter containing the fresh catalyst and then through the tube or converter containing the catalyst in the next most active condition, and so on, the reaction product being withdrawn from the tube or converter containing the least active catalyst.

When carrying out the process in a discontinuous manner during the course of operation catalyst may be manually moved so that the spent catalyst is disposed at the exit end of the system and fresh catalyst added so that it is disposed at the inlet end of the system. Operating with a catalyst gradient involving the more active catalyst at the inlet end of the system we have found facilitates control of secondary reactions, permitting higher production rates and avoids excessive phenol formation; this, therefore, is considered an important feature of our invention.

Catalytically active nickel, promoted or unpromoted, produced by any known method, may be employed as the catalyst. We have found, however, that spent nickel hydrogenation or dehydrogenation catalysts heated in air to reactivate the same are surprisingly active catalysts for use in the practice of our invention. Nickel catalysts which have first been used to catalyze hydrogenation reactions such as the hydrogenation of tar acids including phenols, cresols, xylenols and aromatic hydrocarbons such as benzene, toluene, xylene and other phenol and benzene substitution products, and then used for catalyzing the dehydrogenation of cyclohexanols to cyclohexanones have also been found to be surprisingly active catalysts. Nickel catalysts in the form of turnings, rings, helices, wool, gauze, sheets etc., activated by producing an adherent layer of nickel oxalate on the nickel masses, then decomposing the oxalate, for example, by oxidizing in air at elevated temperature, e. g. 300° to 380° C., to convert the same into an adherent layer of nickel oxide and then reducing the oxide to catalytically active nickel, are also suitable. Nickel catalysts produced by treating nickel masses, preferably in the form of turnings, helices, rings or gauze with nitric acid vapors to form an adherent layer of nickel nitrate, then decomposing the nitrate layer by roasting to produce an adherent nickel oxide layer and finally reducing the oxide layer to nickel may be employed. Catalysts made by impregnating pumice, Alundum, "Celite," or other inert carrier with nickel nitrate, decomposing the nitrate by roasting in air to produce the oxide and then reducing the oxide by treatment with hydrogen are also suitable catalysts. All of the above mentioned catalysts involving a nickel oxide layer on a metallic or non-metallic base or carrier after use as a hydrogenation catalyst have been found to be surprisingly active dehydrogenation catalysts.

Of the cyclohexanols dehydrogenated in accordance with this invention to produce the corresponding ketones may be mentioned cyclohexanol, methyl cyclohexanols, dimethyl cyclohexanols, and other substituted cyclohexanols containing alkyl substituents having up to and including four carbon atoms.

*Example 1.*—The following example is illustrative of a preferred embodiment of the process of this invention carried out in equipment involving a train of 2 catalyst tubes or converters each 4 inches inside diameter and 78 inches long. Each converter was filled with 2 nickel screen catalyst cages each 3⅞ inches outside diameter and 36 inches long, packed with a nickel catalyst in the amount of about 17 pounds per cage. The nickel catalyst was produced by heating nickel turnings which had previously been used as a hydrogenation catalyst in a current of air in a tube having a wall temperature of about 250° to 300° C.

The raw material employed and hereinafter termed methyl cyclohexanol contained 1.2% methyl cyclohexanone, 1.5% cresol, and 90% to 96% methyl cyclohexanols. This material was supplied to a vaporizer at a rate of 70 pounds per hour. The vaporized methyl cyclohexanol at this rate and hydrogen supplied at a rate of 1000 cubic feet per hour measured at the working pressure were fed to the first of the series of 2 catalyst tubes, the mixture of the products of reaction formed being fed from the first tube through the other tube in series. The temperatures in the first reaction tube were about 200°—245° C.; in the second reaction tube the temperatures were about 245°—260° C. The working pressure was about 0.5 atmospheres.

In this example it was estimated that 79 pounds of methyl cyclohexanol were fed per hour per cubic foot of reaction volume; 2.1 mols of hydrogen were fed per mol of methyl cyclohexanol; the apparent contact time was 1.25 seconds; and the linear gas velocity was 9.5 feet per second. On analysis, the product was found to contain 1.2% water, 4.2% methyl cyclohexane, 50% methyl cyclohexanone, 4.1% cresol, and 39% to 40% unchanged methyl cyclohexanol, the methyl cyclohexanol content being obtained by difference.

*Example 2.*—The catalytic converters used in this example were the same as in Example 1. The catalyst was made by passing nitric acid vapors over nickel particles and then decomposing the nitrate to produce an adherent layer of oxide on the nickel base. Approximately 17 pounds of this catalyst per cage were employed.

The raw material used contained 0.3% cyclohexanone, 1.6% phenol, a trace of water, and about 98% cyclohexanol. This material was supplied to the vaporizer at the rate of 60 pounds per hour. The vaporized cyclohexanol at this rate and hydrogen at the rate of 500 cubic feet per hour measured at the working pressure were fed to the first of a series of two catalyst tubes, the mixture of the products of the reaction formed being fed from the first tube to the other tube. The temperatures in the first reaction tube were about 200°—250° C., and in the second tube were about 250°—272° C. The working pressure was about 1.14 atmospheres.

In this example it was estimated that about 68 pounds of cyclohexanol were fed per hour per cubic foot of reaction volume; 2.5 mols of hydrogen were fed per mol of cyclohexanol; the apparent contact time was 2.6 seconds and the linear gas velocity was about 4.6 feet per second. On analysis, the product was found to contain 54% cyclohexanone, 4.2% phenol, 0.2% water, 0.6% cyclohexane and 41% cyclohexanol, the cyclohexanol content being obtained by difference.

*Example 3.*—The catalytic converters used in this example were the same as those involved in Example 1. The catalyst used was a nickel base catalyst which had been previously used for 60 hours for the hydrogenation of cresols; this catalyst was made by dipping fresh nickel turnings in nickel nitrate, and decomposing the nickel nitrate to form the oxide. During the course of its previous use the catalyst had been reactivated several times by dipping the cage containing the spent catalyst particles in nickel nitrate and decomposing the nitrate coating to produce an adherent layer of oxide on the catalyst particles within the cage. Approximately 25 pounds of the used catalyst were placed in each cage.

The raw material employed contained 1.0% methyl cyclohexanone, 0.5% cresol, 0.5% water, 1.0% methyl cyclohexane and 97% methyl cyclohexanol. This material was supplied to a vaporizer at the rate of 103 pounds per hour. The vaporized methyl cyclohexanol at this rate and hydrogen supplied at the rate of 1000 cubic feet per hour measured at the working pressure were fed to the first of a series of two catalyst tubes, the mixture of the products of reaction formed being fed from the first tube to the other tube. The temperatures in the first reaction tube were about 200°—250° C., and in the second reaction tube were about 250°—280° C.; the working pressure was about 1.2 atmospheres.

In this example it was estimated that 115 pounds of methyl cyclohexanol were fed per hour per cubic foot of reaction volume; 3.3 mols of hydrogen were fed per mol of methyl cyclohexanol; the apparent contact time was 1.4 seconds and the linear gas velocity was 8.5 feet per second. On analysis, the product was found to contain 50% methyl cyclohexanone, 2.3% cresol, 0.7% water, 2% methyl cyclohexane and 45% methyl cyclohexanol, the methyl cyclohexanol content being obtained by difference.

*Example 4.*—The catalytic converters used in this example were the same as those of Example 1. The catalyst employed was a pumice base catalyst coated with nickel oxide which had been previously used for 25 hours in the hydrogenation of phenol; this catalyst was made by dipping the pumice base in nickel nitrate and heating in air to decompose the nitrate to form an oxide layer on the pumice base. During the course of its previous use the catalyst had been reactivated several times by dipping the cage containing the spent catalyst particles in nickel nitrate and decomposing the nitrate coating on the particles to produce an adherent layer of oxide on the catalyst particles within the cage. Each cage used in this example contained approximately 10 pounds of the used catalyst.

The raw material employed contained 2.0% cyclohexanone, 0.8% phenol, 0.5% water, 0.7% cyclohexane and 96% cyclohexanol. This material was supplied to a vaporizer at the rate of 90 pounds per hour. The vaporized cyclohexanol at this rate and hydrogen supplied at the rate of 1000 cubic feet per hour measured at the working pressure were fed to the first of a series of two catalyst tubes, the mixture of the products of reaction formed being fed from the first tube to the other tube. The temperatures in the first reaction tube were about 200°—250° C., and in the second reaction tube were about 250°—280° C.; the working pressure was about 1.1 atmospheres.

In this example it was estimated that 101 pounds of cyclohexanol were fed per hour per cubic foot of reaction volume; 3.3 mols of hydrogen were fed per mol of cyclohexanol; the apparent contact time was 1 second and the linear gas velocity was 12 feet per second. On analysis the product was found to contain 49% cyclohexanone, 2.5% phenol, 0.8% water, 0.7% cyclohexane, and 47% unchanged cyclohexanol, the cyclohexanol content being obtained by difference.

In carrying out the process of this invention we have found that throughputs of the order of 4 to 8 times that heretofore obtainable by prior art procedures known to us are possible following the conditions of our invention without sacrifice to the percentage conversion of cyclohexanols. In view of this substantial increase in throughput it will be appreciated that our invention permits dehydrogenation of cyclohexanols to cyclohexanones at capacities which are commercially attractive, i. e. permits the quantity or relatively large capacity production of cyclohexanones by the dehydrogenation of cyclohexanols.

Since certain changes may be made without departing from the scope of the invention, it is intended that the above shall be interpreted as illustrative and not in a limiting sense.

We claim:

1. In the process of dehydrogenating cyclohexanols to produce cyclohexanones, the improvement which comprises contacting a cyclohexanol in the vapor phase mixed with hydrogen in the amount of at least 2 mols of hydrogen per mol of cyclohexanol under a pressure within the range of from .3 to 5 atmospheres with a nickel catalyst in a catalyst zone while maintaining in the catalyst zone temperature conditions within the range of 200° to 350° C.

2. In the process of dehydrogenating cyclohexanols to produce cyclohexanones, the improvement which comprises passing a cyclohexanol in the vapor phase mixed with hydrogen in the amount of at least 2 mols of hydrogen per mol of cyclohexanol under a pressure within the range of from .3 to 5 atmospheres over nickel catalyst in a catalyst zone at a rate such that the apparent time of contact with the catalyst is less than 30 seconds while maintaining in the catalyst zone temperature conditions within the range of from 200° to 350° C.

3. The process of dehydrogenating cyclohexanol to produce cyclohexanone which comprises passing cyclohexanol in the vapor phase mixed with hydrogen in the amount of from about 2 to about 4 mols of hydrogen per mol of cyclohexanol under a pressure within the range of .3 to 5 atmospheres over nickel catalyst of varying activity arranged in a catalyst zone so that the catalyst in the portion of the zone where the mixture of hydrogen and cyclohexanol is initially contacted with the catalyst is more active than the catalyst in the portion of the zone where the products of the reaction are withdrawn from the catalyst, maintaining the temperature conditions in the catalyst zone within the range of from about 200° to 350° C. and controlling the flow of the mixture of cyclohexanol and hydrogen over the catalyst so that the apparent time of contact with the catalyst is less than 30 seconds.

4. The process of dehydrogenating cyclohexanol to produce cyclohexanone which comprises passing cyclohexanol in the vapor phase mixed with hydrogen in the amount of from about 2 to about 4 mols of hydrogen per mol of cyclohexanol under a pressure within the range of .3 to 5 atmospheres through a catalyst zone containing nickel catalyst of varying activity arranged so that the catalyst at the inlet portion of the zone is more active than the catalyst at the outlet portion of the zone, maintaining the temperature conditions in the catalyst zone within the range of from about 200° to 350° C., the temperature being maintained lower in the neighborhood of the inlet than in the neighborhood of the outlet of the zone, and controlling the flow of the mixture of cyclohexanol and hydrogen over the catalyst so that the apparent time of contact with the catalyst is less than 30 seconds.

5. The process of dehydrogenating cyclohexanol to produce cyclohexanone which comprises passing cyclohexanol in the vapor phase mixed with hydrogen in the amount of from 2 to 4 mols of hydrogen per mol of cyclohexanol under a pressure within the range of from .3 to 5 atmospheres over nickel catalyst in a catalyst zone at a rate such that the apparent time of contact with the catalyst is less than 10 seconds while maintaining in the catalyst zone temperature conditions within the range of 250° to 280° C.

6. The process of dehydrogenating methyl cyclohexanol to methyl cyclohexanone which comprises passing methyl cyclohexanol in the vapor phase mixed with hydrogen in the amount of from 2 to 4 mols of hydrogen per mol of methyl cyclohexanol under a pressure within the range of from .3 to 5 atmospheres over nickel catalyst in a catalyst zone at a rate such that the apparent time of contact with the catalyst is less than 10 seconds while maintaining in the catalyst zone temperature conditions within the range of 250° to 280° C.

7. The process of dehydrogenating cyclohexanols to produce cyclohexanones which comprises passing cyclohexanols in the vapor phase mixed with hydrogen in the amount of at least 2 mols of hydrogen per mol of cyclohexanol over a stationary nickel catalyst mass, maintaining in the catalyst zone a pressure of from 0.3 to 5 atmospheres and a temperature within the range of 200° to 350° C., regulating the flow rate of the hydrogen and cyclohexanol so that the apparent contact time is less than thirty seconds, and maintaining throughout the catalyst zone a catalyst gradient such that the most active nickel catalyst is maintained in the zone where the mixture of hydrogen and cyclohexanol in the vapor phase is initially contacted with the catalyst, and the least active catalyst is maintained in the zone where the products of reaction are withdrawn from the catalyst zone.

8. The process of dehydrogenating cyclohexanol to produce cyclohexanone which comprises passing cyclohexanol in the vapor phase mixed with hydrogen, in the amount of at least 2 mols of hydrogen per mol of cyclohexanol over a stationary nickel catalyst selected from the group consisting of (1) nickel catalyst previously used for catalyzing hydrogenation of tar acids; (2) nickel catalyst previously used for catalyzing hydrogenation of aromatic hydrocarbons; (3) nickel catalyst previously used for hydrogenation of tar acids and then heated in air; and (4) nickel catalyst previously used for hydrogenation of aromatic hydrocarbons and then heated in air; maintaining in the catalyst zone a pressure of about 1 atmosphere, and a temperature within the range of about 200° to about 350° C., regulating the flow rate of the hydrogen and cyclohexanol so that the apparent contact time is less than about 10 seconds, and maintaining throughout the catalyst zone a catalyst gradient such that the most active nickel catalyst is maintained in the zone where the mixture of hydrogen and cyclohexanol in the vapor phase is initially contacted with the catalyst, and the least active catalyst is maintained in the zone where the products of reaction are withdrawn from the catalyst zone.

9. The process of dehydrogenating cyclohexanol to produce cyclohexanone which comprises passing cyclohexanol in the vapor phase mixed with hydrogen in the amount of from about 2 to about 4 mols of hydrogen per mol of cyclohexanol over a stationary nickel catalyst selected from the group consisting of (1) nickel catalyst previously used for catalyzing hydrogenation of tar acids; (2) nickel catalyst previously used for catalyzing hydrogenation of aromatic hydrocarbons; (3) nickel catalyst previously used for hydrogenation of tar acids and then heated in air; and (4) nickel catalyst previously used for hydrogenation of aromatic hydrocarbons and then heated in air; maintaining in the catalyst zone a pressure of about 1 atmosphere and a temperature within the range of from about 250° to about 280° C., correlating the linear velocity of the cyclohexanol-hydrogen mixture to the extent of the catalyst zone so that the apparent time of contact with the catalyst is less than 10 seconds, and maintaining throughout the catalyst zone a catalyst gradient such that the most active nickel catalyst is maintained in the zone where the mixture of hydrogen and cyclohexanol in the vapor phase is initially contacted with the catalyst and the least active catalyst is maintained in the zone where the products of reaction are withdrawn from the catalyst zone.

10. The process of dehydrogenating methyl cyclohexanol to produce methyl cyclohexanone which comprises passing methyl cyclohexanol in the vapor phase mixed with hydrogen in the amount of from about 2 to about 4 mols of hydrogen per mol of methyl cyclohexanol over a stationary nickel catalyst selected from the group consisting of (1) nickel catalyst previously used for catalyzing hydrogenation of tar acids; (2) nickel catalyst previously used for catalyzing hydrogenation of aromatic hydrocarbons; (3) nickel catalyst previously used for hydrogenation of tar acids and then heated in air; and (4) nickel catalyst previously used for hydrogenation of aromatic hydrocarbons and then heated in air; maintaining in the catalyst zone a pressure of about 1 atmosphere and a temperature within the range of from about 250° to about 280° C., correlating the linear velocity of the methyl cyclohexanol-hydrogen mixture to the extent of the catalyst zone so that the apparent time of contact with the catalyst is less than 10 seconds, and maintaining throughout the catalyst zone a catalyst gradient such that the most active nickel catalyst is maintained in the zone where the mixture of hydrogen and methyl cyclohexanol in the vapor phase is initially contacted with the catalyst and the least active catalyst is maintained in the zone where the products of reaction are withdrawn from the catalyst zone.

11. The process of dehydrogenating a material from the group consisting of cyclohexanol and cyclohexanols containing alkyl substituents each having not more than 4 carbon atoms, which comprises passing said material in the vapor phase mixed with hydrogen in the amount of at least 2 mols of hydrogen per mol of said material over a stationary nickel catalyst, maintaining in the catalyst zone a pressure of from about 0.3 to about 5 atmospheres and a temperature within the range of about 200° to about 350° C., and regulating the flow rate of the hydrogen and said material so that the apparent contact time is less than 30 seconds.

AUGUSTUS S. HOUGHTON.
HOMER E. McNUTT.